(12) United States Patent
Engfehr et al.

(10) Patent No.: US 10,794,346 B2
(45) Date of Patent: Oct. 6, 2020

(54) FUEL RAIL

(71) Applicant: Caterpillar Inc., Deerfield, IL (US)

(72) Inventors: Matthew J. Engfehr, Dunlap, IL (US);
Brian M. Boksa, Lafayette, IN (US);
Brian S. Jones, Battle Ground, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/256,740

(22) Filed: Jan. 24, 2019

(65) Prior Publication Data
US 2020/0240376 A1 Jul. 30, 2020

(51) Int. Cl.
*F02M 55/02* (2006.01)
*F02M 69/46* (2006.01)
*F02D 19/06* (2006.01)

(52) U.S. Cl.
CPC ....... *F02M 55/025* (2013.01); *F02D 19/0684* (2013.01); *F02M 69/465* (2013.01); *F02M 2200/856* (2013.01); *F02M 2200/857* (2013.01)

(58) Field of Classification Search
CPC .............. F02D 19/0684; F02M 55/025; F02M 69/465; F02M 2200/856
USPC ........................................ 123/456, 468, 470
See application file for complete search history.

(56) References Cited

U.S. PATENT DOCUMENTS

| | | | |
|---|---|---|---|
| 5,379,737 A | 1/1995 | Hu | |
| 5,806,494 A * | 9/1998 | Glassey | F02M 57/025 123/456 |
| 7,827,962 B2 * | 11/2010 | Weizenauer | F02M 55/025 123/456 |
| 7,942,136 B2 | 5/2011 | Lepsch et al. | |
| 9,027,534 B2 | 5/2015 | Kim et al. | |
| 9,038,599 B2 * | 5/2015 | Matsukawa | F02M 55/025 123/456 |
| 9,038,600 B2 * | 5/2015 | Stichlmeir | F02M 55/025 123/456 |
| 9,797,342 B2 | 10/2017 | Shafer et al. | |
| 2003/0116137 A1 * | 6/2003 | Koseki | B22D 19/0009 123/468 |
| 2012/0145127 A1 * | 6/2012 | Parsons | F02M 37/20 123/468 |
| 2013/0074805 A1 * | 3/2013 | Yamamoto | F02M 51/06 123/456 |
| 2013/0327296 A1 * | 12/2013 | Gibson | F02M 21/0287 123/456 |

FOREIGN PATENT DOCUMENTS

| | | |
|---|---|---|
| CN | 201751541 U | 2/2011 |
| CN | 202370606 U | 8/2012 |
| CN | 103244231 A | 8/2013 |
| EP | 0475829 A1 | 3/1992 |
| JP | 02163465 A | 6/1990 |

* cited by examiner

*Primary Examiner* — Erick R Solis
(74) *Attorney, Agent, or Firm* — Bookoff McAndrews

(57) ABSTRACT

A fuel rail for an engine includes a tubular body having an outer surface and an inner surface, the inner surface defining a longitudinally extending fuel bore. The fuel rail also includes a valve bore extending normal to the fuel bore and extending through the outer surface of the tubular body at a first end and completely through the fuel bore to a second end.

20 Claims, 5 Drawing Sheets

FUEL RAIL

TECHNICAL FIELD

The present disclosure relates generally to internal combustion engines, and more particularly, to fuel rails for internal combustion engines.

BACKGROUND

Internal combustion engines for stationary or mobile machinery may employ liquid or gaseous fuel. For example, diesel fuel may be employed in a diesel engine to provide a desired torque and combustion efficiency. Gaseous fuel, such as natural gas, may be used in a gaseous fuel engine to provide adequate torque, while achieving reduced fuel cost and potentially improved emissions. Some internal combustion engines, known as dual-fuel engines, are configured to run on two different fuels. For example, some dual-fuel internal combustion engines can employ diesel fuel as a pilot fuel and natural gas as a primary fuel. Whether a single fuel or a dual-fuel engine, pressurized fuel may be provided to an intake of the engine cylinders. One or more fuel rails may provide a reservoir for delivering pressurized fuel to the intake of the engine cylinders. The fuel rail(s) may provide fuel to a plurality of intake valves or fuel injectors of the internal combustion engine.

Fuel for the internal combustion engine may pass from the fuel rail to the engine in a pressurized state. When one or more of the valves connected to the fuel rail opens, fuel flows from the fuel rail to an engine component. The fuel may follow an indirect or even tortuous path when traveling from the fuel rail to the combustion chambers of the internal combustion engine. This path increases the distance between the outlet of the fuel rail and the internal combustion engine, which may reduce the responsiveness of the engine and complicate the control (e.g. intake valve, injector, and admission valve timing) of the engine. Also, fuel may travel to a valve located entirely outside of the fuel rail and pass through areas of differing cross-sectional areas, which may create undesired pressure drops in the supplied fuel.

U.S. Pat. No. 7,942,136 B2 to Lepsch et al., describes a fuel system for an internal combustion engine. The fuel system of the '136 patent includes a fuel rail having a main tube and four secondary tubes. Each secondary tube includes a fuel outlet connected to an injection valve. The injection valves are kept secured to the secondary tube by means of a clamp. While the fuel rail of the '136 patent may be useful in some situations, it may be problematic in other situations. For example, the fuel rail of the '136 patent may experience fuel leakage when the clamps securing the injection valves loosen or wear over time.

The present disclosure may solve one or more of the problems set forth above and/or other problems in the art. The current scope of the disclosure, however, is defined by the attached claims and not by the ability to solve any specific problem.

SUMMARY

In one aspect, a fuel rail for an engine may include a tubular body having an outer surface and an inner surface, the inner surface defining a longitudinally extending fuel bore. The fuel rail may also include a valve bore extending normal to the fuel bore and extending through the outer surface of the tubular body at a first end and completely through the fuel bore to a second end.

In another aspect, a fuel rail segment for an internal combustion engine may include a tubular body having an outer surface and an inner surface, the inner surface defining a longitudinally extending fuel bore. The fuel rail segment may include a valve bore extending through the outer surface of the tubular body at a first end, and an outlet channel having an inlet opening and an outlet opening, the inlet opening located at a different circumferential position on the tubular body than the outlet opening.

In a further aspect, a fuel rail system for an internal combustion engine including an engine block and a cylinder head having a bottom surface facing the engine block, a top surface, and a side surface may include a fuel rail component. The fuel rail component may be fixed to the side surface of the cylinder head. The fuel rail component may have: a tubular body with an outer surface and an inner surface, an outlet channel in fluid communication with the internal combustion engine, the outlet channel being open toward the top surface of the cylinder head, and a valve bore extending through the outer surface and open toward the top surface of the cylinder head.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," "generally," and "approximately" are used to indicate a possible variation of ±10% in a stated value or characteristic.

Figure 1:
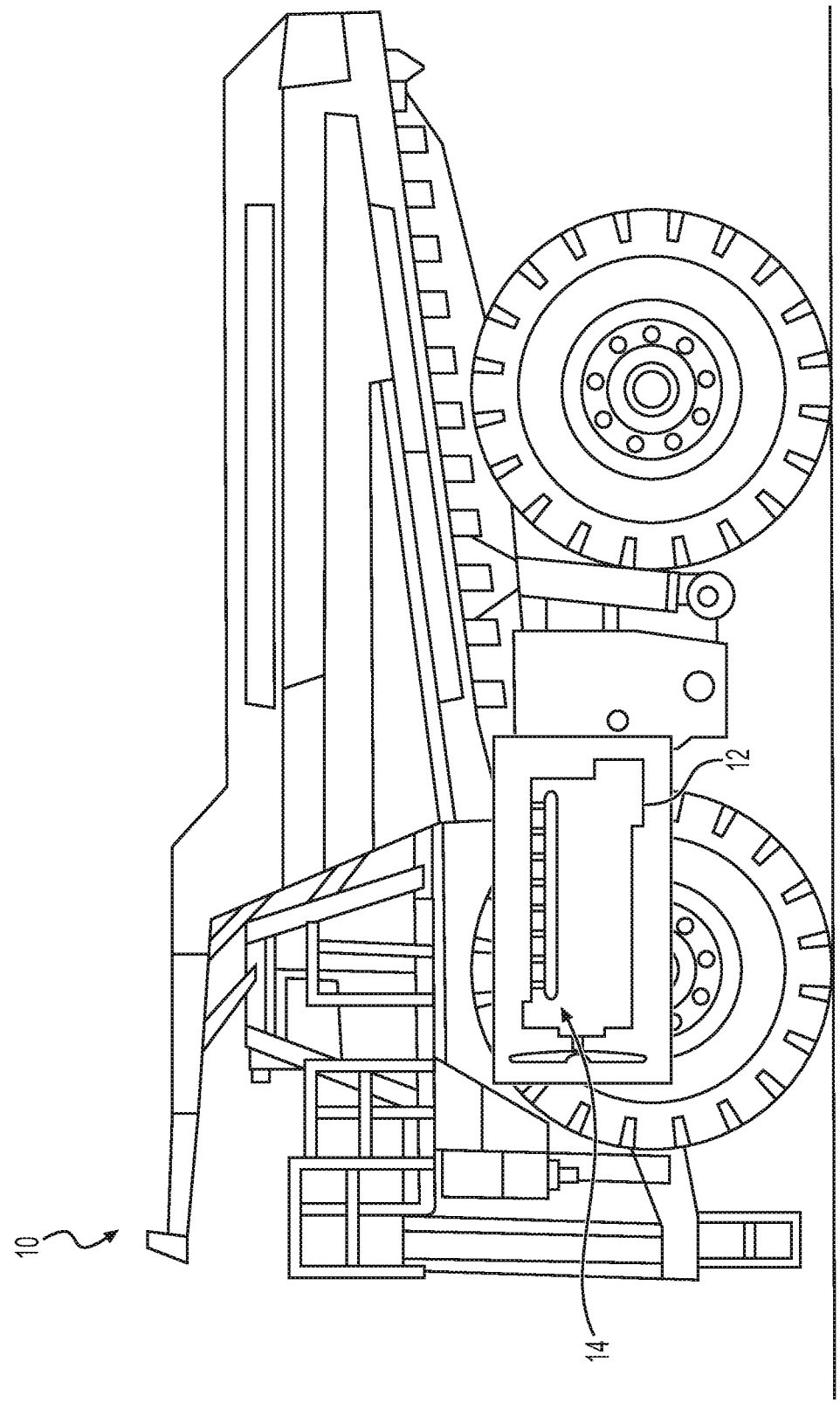
FIG. 1 is a schematic side view of a mobile machine having an internal combustion engine and a fuel rail according to aspects of the disclosure.

FIG. 1 illustrates a machine 10 that includes an internal combustion engine 12. Machine 10 may be a stationary machine, or a mobile machine as shown. Internal combustion engine 12 may provide a primary power source to drive various components of machine 10. One or more banks (rows) of cylinders are provided in internal combustion engine 12 for the combustion of fuel. In one aspect, internal combustion engine 12 may be a dual-fuel engine that is capable of operating in both a dual-fuel mode and a single fuel mode. In a dual-fuel mode, internal combustion engine 12 may be configured to supply two different fuels to a combustion chamber for a single combustion event. For example, the combustion chamber may be supplied with a pilot supply of diesel fuel and a main supply of gaseous fuel. As used herein, gaseous fuel may include natural gas, propane gas, methane gas or any other fuel in gaseous form suitable for combustion in an internal combustion engine. In a single fuel mode of combustion engine 12, only one fuel, e.g. diesel fuel, may be used to power internal combustion engine 12.

Internal combustion engine 12 may include a longitudinally-extending fuel rail 14 that provides fuel from a supply tank to an intake of the internal combustion engine 12. The fuel supplied by fuel rail 14 may be a main fuel for a dual fuel engine or a single fuel for a single fuel engine. One fuel rail 14 may be provided for each bank of cylinders when the internal combustion engine 12 is a single fuel engine. Thus, fuel rail 14 may be a common fuel rail for a plurality of cylinders of internal combustion engine 12. Two fuel rails 14 (one shown in FIG. 1) may be provided for each bank of cylinders when internal combustion engine 12 is a dual-fuel internal combustion engine. One of the fuel rails 14 for each cylinder bank may provide liquid fuel, such as diesel fuel, while the other fuel rail 14 for each cylinder bank may provide gaseous fuel, such as natural gas. Thus, in an exemplary configuration where internal combustion engine 12 is a dual fuel internal combustion engine having two banks of cylinders, a total of four fuel rails 14 may be provided.

Internal combustion engine 12 is, for example, a sixteen cylinder internal combustion engine having two rows of cylinders. However, internal combustion engine 12 may have less or more cylinders. For example, internal combustion engine 12 may include twelve or eight cylinders. Internal combustion engine 12 may be formed with multiple cylinder banks or with a single cylinder bank. In one aspect, internal combustion engine 12 may be a sixteen cylinder engine having two cylinder banks of eight engine cylinders each.

For a dual-fuel engine having two cylinder banks, two fuel rails 14 may provide a supply of pressurized gaseous fuel. Another two fuel rails 14 may supply diesel fuel. While all four of these fuel rails 14 may have a substantially identical structure, it may be desirable to provide fuel rails for the supply of diesel fuel with a differing structure as compared to fuel rails 14 for the supply of gaseous fuel. In one aspect, each pair of fuel rails 14 may be approximately identical with respect to each other.

Figure 2:
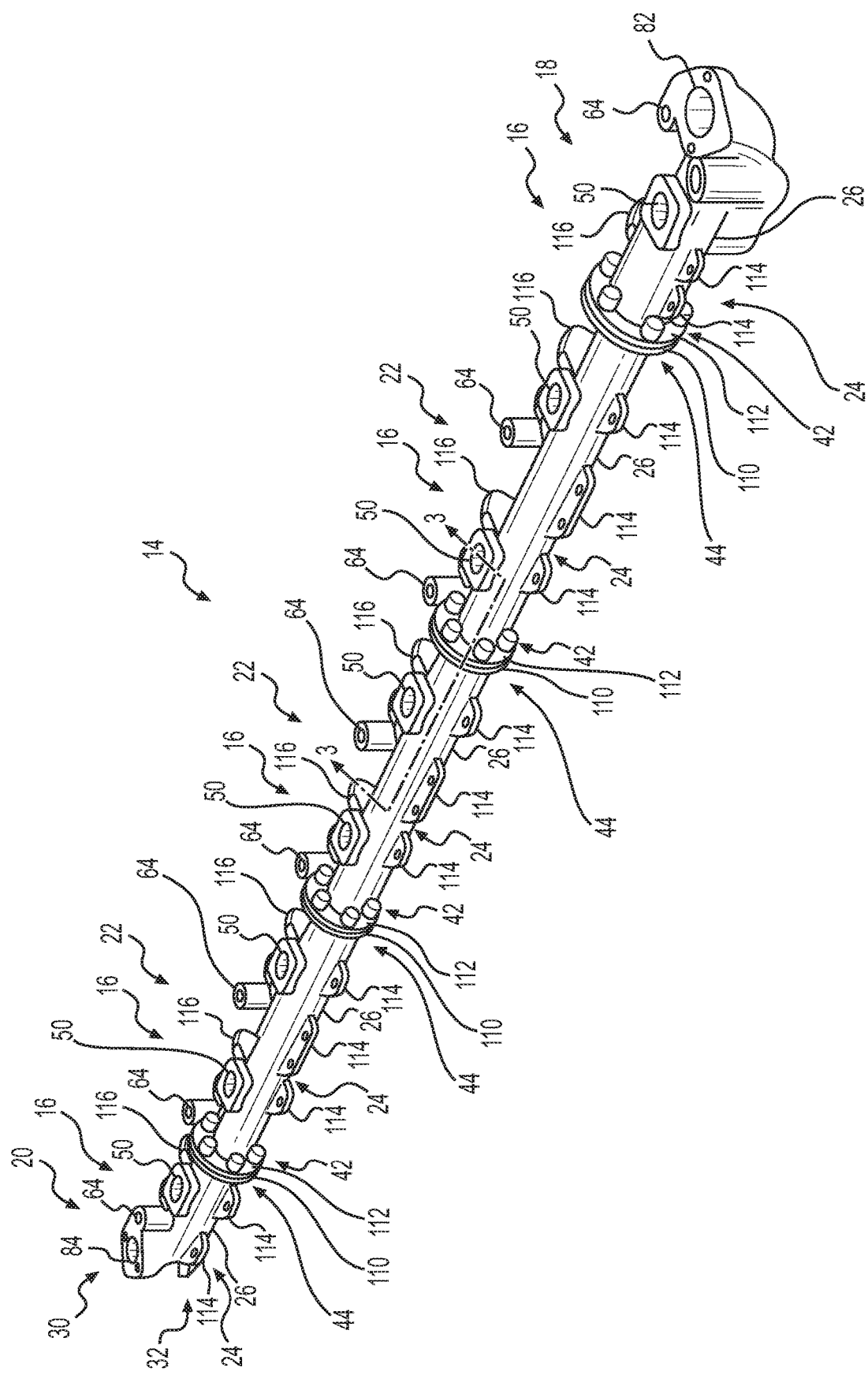
FIG. 2 is a perspective view of the fuel rail of FIG. 1.

FIG. 2 is a perspective view of an exemplary fuel rail 14 attached to the internal combustion engine 12 in FIG. 1. Fuel rail 14 may be a modular fuel rail having one or more fuel rail components or segments 16 fixedly connected to each other. These connected segments 16 include two opposite end segments 18, 20, and one or more intermediate segments 22. An inlet end segment 18 receives a flow of pressurized fuel from a fuel supply source such as a fuel pump via a fuel rail inlet 82. At the opposite end of fuel rail 14, an outlet end segment 20 may be provided. Outlet end segment 20, may include a fuel rail outlet 84 at a longitudinal end of fuel rail 14. Fuel rail outlet 84 may be sealed with an air-tight cover, may include a pressure relief system, and/or may be connected to a fuel recirculation component to return a flow of fuel to a fuel circuit including the pressure pump. While the fuel rail inlet 82 and fuel rail outlet 84 may be provided as angled components that extend approximately normal to a longitudinal direction of fuel rail 14, fuel rail inlet and fuel rail outlet 82, 84 may be provided without a bend so as to be approximately aligned with the remainder of fuel rail 14. As can be seen in FIG. 2, inlet and outlet end segments 18, 20 may form opposite longitudinal ends of fuel rail 14. While three intermediate segments 22 are illustrated in FIG. 2, one, two, or four intermediate segments 22 may be provided between inlet and outlet end segments 22. If desired, more than four intermediate segments may be provided between inlet and outlet end segments 18, 20.

Each segment 16 may be connected to an adjacent segment by modular flanges 110, 112 to form an air-tight seal between each pair of segments 16. Inlet end segment 18 may include a flange 112 at a first longitudinal end 42 thereof. An intermediate segment 22 is fixed to inlet end segment 18 by flange 110 disposed at second longitudinal end 44 of intermediate segment 22 to form an air-tight seal between intermediate segment 22 and inlet end segment 18. The opposite first longitudinal end 42 of intermediate segment 22 includes flange 112. Thus, intermediate segment 22 may include a pair of flanges 110, 112 to connect to inlet or outlet end segments 18, 20 or another intermediate segment 22. Outlet end segment 20 includes a flange 110 at second longitudinal end 44 to connect to flange 112 of an adjacent intermediate segment 22.

Figure 3:
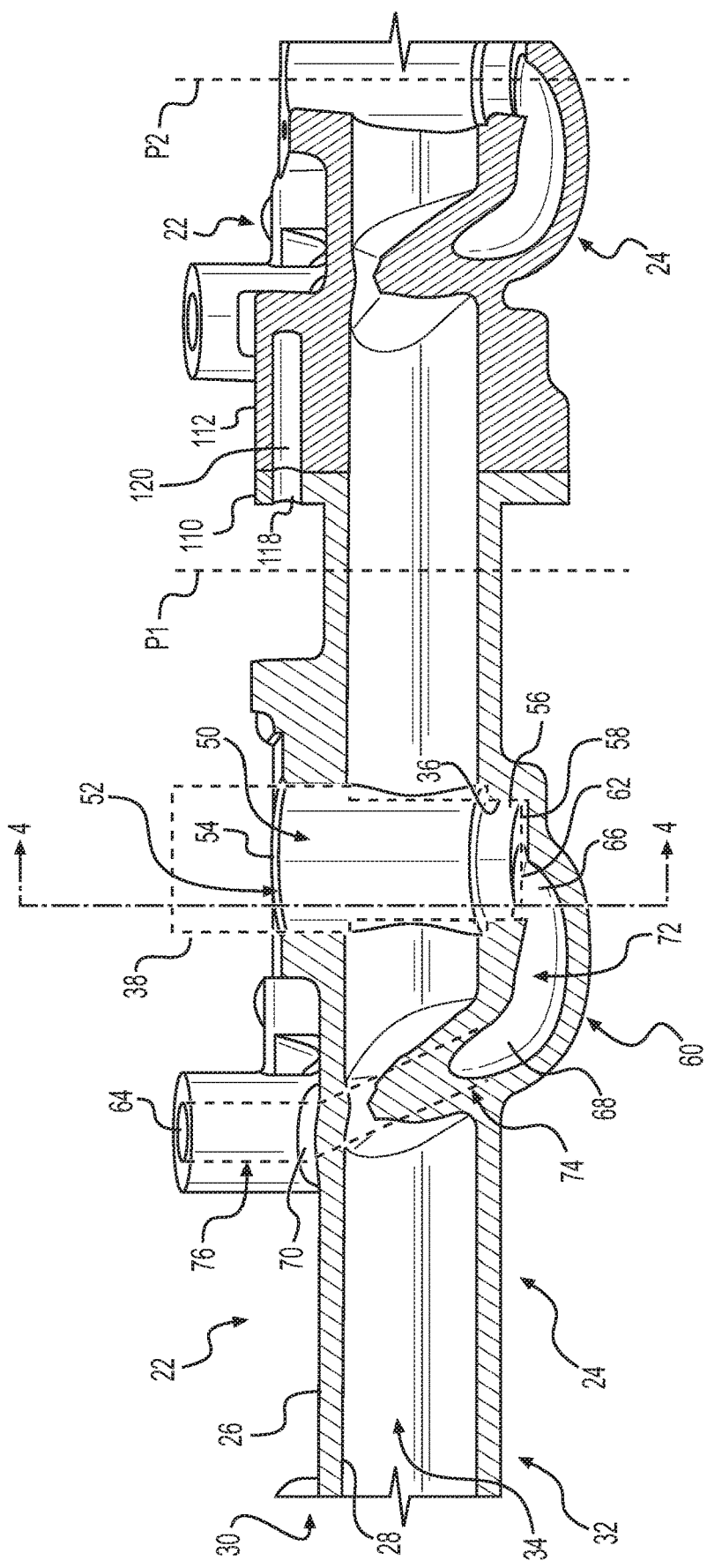
FIG. 3 is a sectional view of a pair of segments of the fuel rail of FIG. 1 as viewed along line 3-3 of FIG. 2.

Flange 110 includes a series of through holes 118 that align with blind holes 120 of the corresponding flange 112 (see FIG. 3). A fastener such as a bolt may be inserted through each pair of aligned through holes 118 and blind holes 120 to secure each pair of segments 16. In one aspect, blind holes 120 may be internally threaded. While blind holes 120 may extend less than entirely through both ends of flange 112 (see FIGS. 2 and 3), blind holes 120 may instead be provided as through holes such that a fastener extends entirely through holes 118 and 120 receive a fixing nut. The longitudinal position of flanges 110, 112 may be reversed such that flange 110 is located at first longitudinal end 42 and flange 112 is provided at second longitudinal end 44, if desired.

Segments 16 of fuel rail 14 each form a tubular body 24. Tubular body 24 may include an outer surface 26 which surrounds an inner surface 28 of tubular body 24. One or more valve bores 50 are formed at a first (e.g. upper) side 30 of tubular body 24 and extend through outer surface 26 at first side 30 as well as through inner surface 28 (see FIG. 3). A second (e.g. lower) side 32 of tubular body 24 is formed diametrically opposite of first side 30. As can be seen in FIG. 2, each intermediate segment 22 may include two valve bores 50. Each inlet and outlet end segment 18, 20 may include one valve bore 50. Thus, a series of admission valves 38 (shown in dashed lines in FIGS. 3 and 4) may be disposed in each segment 16, including inlet end segment 18, outlet end segment 20, and intermediate segment 22. Intermediate segments 22 and/or inlet and outlet end segments 18, 20 may include less or more valve bores 50. Each valve bore 50 is sized to receive an admission valve 38. Admission valve 38 may have a substantially rectangular or cylindrical shape. However, other shapes may also be employed for admission valve 38 and valve bore 50.

Each segment 16 may also include at least one outlet opening 64 disposed on first side 30 of tubular body 24. Each outlet opening 64 is in fluid communication with the interior of fuel rail 14. As can be seen in FIGS. 2 and 3, each outlet opening 64 corresponds to a respective admission valve 38, and is longitudinally offset from a respective valve bore 50. Thus, one outlet opening 64 may be provided for each end segment 18, 20, while two outlet openings 64 are provided in each intermediate segment 22.

FIG. 3 is a sectional side view along line 3-3 of FIG. 2 showing portions of two intermediate segments 22 of fuel rail 14. As can be seen in FIG. 3, the inner surface 28 of tubular body 24 defines a longitudinally-extending fuel bore 34. Fuel bore 34 extends through each of the segments 16, including inlet and outlet end segments 18, 20, to provide a continuous longitudinal path through the entire length of fuel rail 14 (see FIG. 2).

Fuel bore 34 has a cross-sectional area defined by inner surface 28. This cross-sectional area may be measured in a plane, such as plane P2, extending perpendicular with respect to fuel bore 34. Inner surface 28 is shaped so as to maintain an approximately constant cross-sectional area at each location along the length of fuel bore 34. Thus, the cross-sectional area of fuel bore 34 as measured at plane P2 may be approximately equal to the cross-sectional area of bore 34 at plane P1 at a location longitudinally spaced from valve bore 50.

Valve bore 50 may extend longitudinally in a direction that is orthogonal or normal with respect to fuel bore 34. Valve bore 50 includes an upper opening 52 through which an admission valve 38 may be inserted. Upper opening 52 extends through outer surface 26 and forms a first end 54 of valve bore 50 at the first side 30 of tubular body 24. A second end 56 of valve bore 50 that opposes first end 54 may be formed at second side 32 of tubular body 24. Second end 56 of valve bore 50 may be provided entirely within tubular body 24 and may be defined by the inner surface 28. Valve bore 50 may therefore extend completely through fuel bore 34 from first end 54 to second end 56, as shown in FIG. 3. A circumferentially-extending valve wall 36 is shaped to receive a lower portion of admission valve 38. A valve floor 58 is formed at second end 56 so as to face a bottom surface of admission valve 38.

In each segment 16, an inlet opening 62 may be provided in second end 56 and formed within valve floor 58. Inlet opening 62 may be generally aligned with second end 56 of the valve bore 50. For example, inlet opening 62 may be disposed within an outer circumference of second end 56 of valve bore 50, and/or inside of valve wall 36. In one aspect, inlet opening 62 may be formed offset with respect to a radial center of valve floor 58. Inlet opening 62 may also be longitudinally and circumferentially offset from outlet opening 64. For example, as illustrated in FIG. 3, inlet opening 62 may be located at a different circumferential position on tubular body 24 than outlet opening 64. For example, inlet opening 62 may be located generally diametrically opposite along tubular body 24 than outlet opening 64, such that inlet opening 62 may be on the second, lower side 32, and the outlet opening 64 may be located on the first, upper side 30 of segment 16. FIG. 3 also shows the longitudinal offset between the inlet opening 62 and the outlet opening 64, wherein inlet opening 62 is generally aligned with valve bore 50 and outlet opening 64 is longitudinally distanced along segment 16 from the valve bore 50.

Admission valve 38 seals first end 54 of valve bore 50. Admission valve 38 may controllably seal the second end 56 of valve bore 50 from fuel bore 34 in a fluid-tight manner. An outer surface of admission valve 38 includes at least one opening to permit entry of fuel from fuel bore 34 to an interior thereof. A lower portion of admission valve 38 may open and close in response to a command from a controller such as an engine control module (ECM) and/or an electronic control unit (ECU) to controllably permit a flow of fuel from the interior of admission valve 38 to inlet opening 62. When open in this manner, admission valve 38 provides fluid communication between fuel bore 34 and an outlet channel 60 via inlet opening 62. When closed, admission valve 38 blocks inlet opening 62 of outlet channel 60.

As further shown in FIG. 3, outlet channel 60 may extend within tubular body 24. Outlet channel 60 may extend from inlet opening 62 at the intersection of outlet channel 60 and valve bore 50 to outlet opening 64. Outlet channel 60 transitions from inlet opening 62 via a first bend 66 to a longitudinally-extending transition passage 72. Transition passage 72 extends approximately parallel to fuel bore 34. Transition passage 72 terminates at a second bend 68 and transitions to angled passage 74 that extends obliquely with respect to fuel bore 34. Angled passage 74 which extends from second side 32 and transitions, via a third bend 70, to a straight passage 76 extending within first side 30. Straight passage 76, like valve bore 50, extends approximately orthogonal with respect to fuel bore 34. Thus, valve bore 50 and straight passage 76 are longitudinally offset from one another and generally parallel to one another. Outlet opening 64 of outlet channel 60 may be provided at an end of straight passage 76. Thus, as can be seen in FIG. 3, outlet channel provides a direct passage from an admission valve 38 disposed within an interior of fuel rail 14 and an outlet, outlet opening 64, of fuel rail 14.

Figure 4:
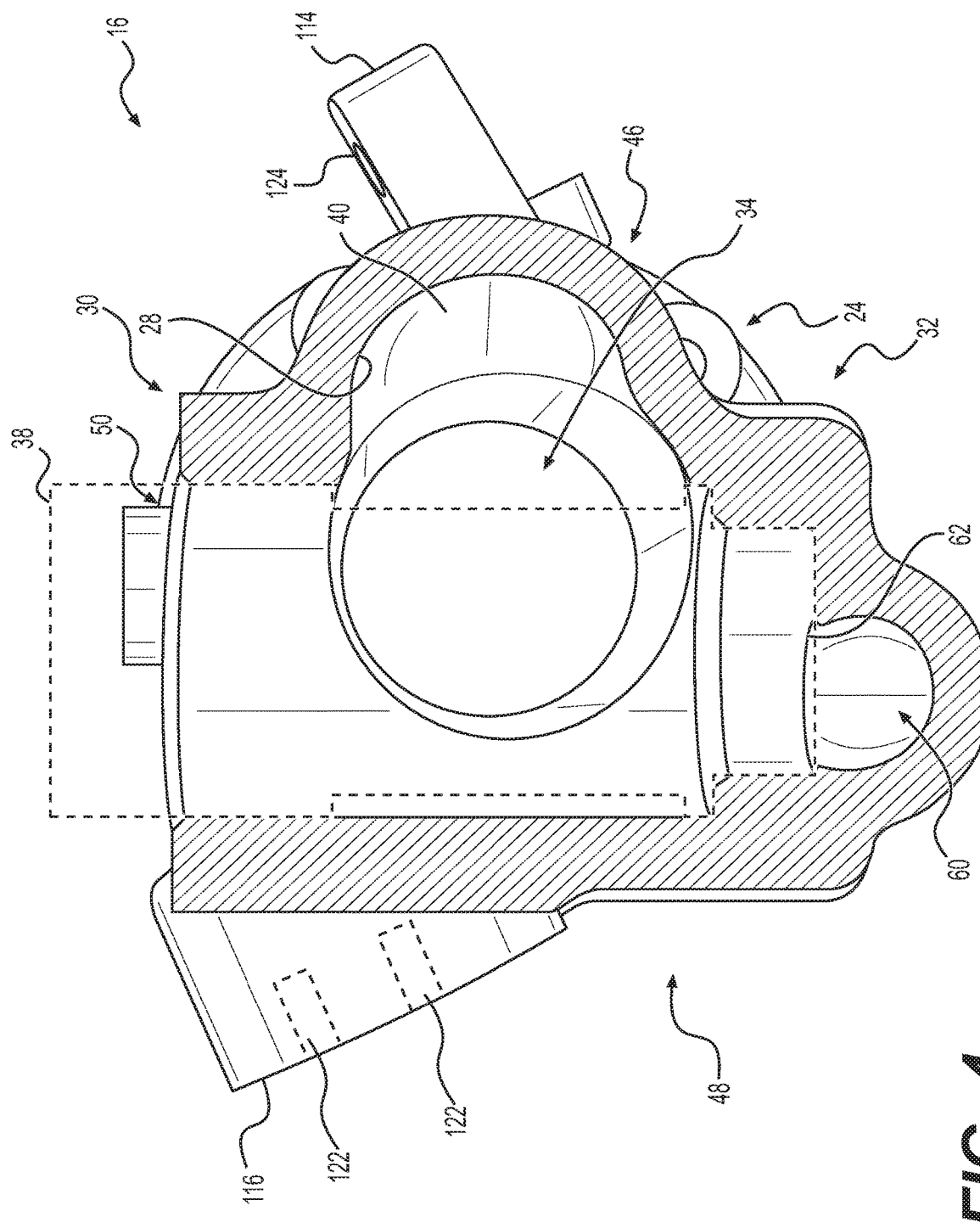
FIG. 4 is a sectional view of a segment of the fuel rail of FIG. 1 as viewed along line 4-4 of FIG. 3.

FIG. 4 is a sectional view of fuel rail segment 16 as viewed from 4-4 of FIG. 3. As can be seen in FIG. 4, valve bore 50 is formed so as to be offset from a center of fuel bore 34. For example, valve bore 50 may be centered at a position that is offset from a center of fuel bore 34. This offset may be in a direction perpendicular to a longitudinal direction of fuel rail segment 16 and perpendicular to a direction in which admission valve 38 may be inserted. An outward bulge 40 of fuel bore 34 extends outward of valve bore 50. The bulge 40 increases the cross-sectional area in the region of valve bore 50 so as to counteract the reduction in cross-sectional area that occurs when admission valve 38 is inserted in valve bore 50.

Bulge 40 may form an area in which the tubular body 24 protrudes to form a convex exterior portion having a concave inner surface 28 of fuel bore 34. Bulge 40 is shaped to provide a cross-sectional area at admission valve 38 that is approximately equivalent to the cross-sectional area at locations upstream and downstream of admission valve 38 along fuel bore 34. Bulge 40 may be provided adjacent to valve bore 50 on a rear (engine-facing) portion 46 of fuel rail 14 that includes rear mounting bracket 114. This rear portion 46 is diametrically opposite to a front (exterior-facing) portion 48 on which a front mounting bracket 116 is provided. Rear mounting bracket 114 is provided outward of bulge 40 and includes a through-hole 124 in which a fastener such as a bolt may be inserted to fix segment 16 to a portion of a cylinder head 90 of internal combustion engine 12. Front mounting bracket 116 may include one or more blind holes 122 for insertion of a fastener such as a bolt. A protective shield (not shown) may be connected to segment 16 via front mounting bracket 116 to be positioned outward of internal combustion engine 12.

Figure 5:
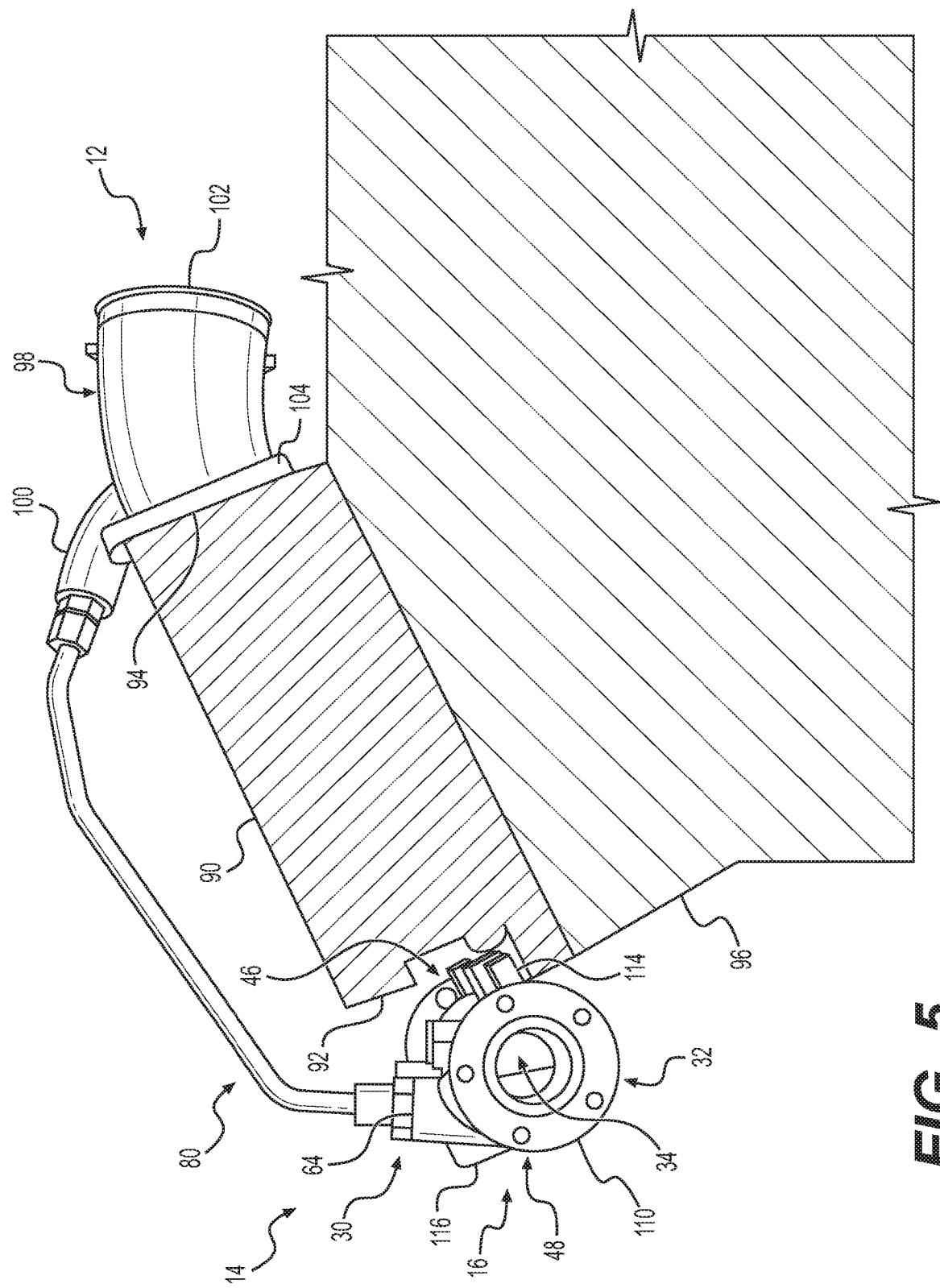
FIG. 5 is a partially schematic perspective view of the internal combustion engine and a segment of the fuel rail of FIG. 1.

FIG. 5 is a perspective side view illustrating internal combustion engine 12 with selected components omitted to provide a clear view of internal combustion engine 12 and fuel rail 14. As illustrated in FIG. 5, internal combustion engine 12 may include a cylinder head 90 having first and second sides 92, 94. Internal combustion engine 12 includes an engine block 96 on which cylinder head 90 is fixed. Together, cylinder head 90 and engine block 96 define a plurality of engine cylinders in which combustion chambers are provided to drive pistons of internal combustion engine 12. Internal combustion engine 12 is operably connected to power/drive various components of mobile machine 10, such as a drive train, electrical system, etc.

Segment 16 of fuel rail 14 may be secured, via rear mounting bracket 114, to a surface of the first side 92 of cylinder head 90. Rear portion 46 of segment 16 faces the first side 92 of cylinder head 90, while front portion 48 faces outward of cylinder head 90. The first side 30 of fuel rail 14 may face generally upward when fuel rail 14 is mounted to the first side 92 of engine head 90.

An intake component of internal combustion engine 12, for example an intake runner 98, may be fixed to a second side 94 of cylinder head 90. Intake runner 98 includes an upstream portion 102 and an opposing downstream portion 104 in fluid communication with each other. Segment 16 of fuel rail 14 is fluidly connected to intake runner 98 via a quill assembly or pressure line 80. Pressure line 80 extends from outlet opening 64 of outlet channel 60 to a fuel admission input 100 of intake runner 98. Fuel admission input 100 is fluidly connected to an internal space of intake runner 98 that extends between upstream portion 102 and downstream portion 104. Thus, a path for pressurized fuel is established from fuel rail 14 to intake runner 98 via pressure line 80. While pressure line 80 may be provided to an intake runner 98 as shown in FIG. 5, pressure line 80 may instead extend from outlet opening 64 to a fuel injector for internal combustion engine 12 that supplies fuel directly to the combustion chamber.

INDUSTRIAL APPLICABILITY

The fuel rail 14 disclosed herein may be applied to any appropriate internal combustion engine, including dual fuel and single fuel engines. The fuel rail 14 disclosed herein may improve transient response of an internal combustion engine. In one aspect, a path of fuel from an admission valve 38 to an intake runner 98 may be shortened by the disclosed fuel rail configuration. In another aspect, a pressure along a length of a fuel rail may be more reliably maintained at an approximately constant level across each admission valve 38. Thus, when internal combustion engine 12 experiences a transient state when power demand increases or decreases, a responsiveness of internal combustion engine 12 may be facilitated as fuel rail 14 supplies a sufficient quantity and pressure of fuel to satisfy the changing demand and minimize problematic pressure variations in fuel exiting the fuel rail 14.

During the operation of machine 10, internal combustion engine 12 performs combustion of one or more types of fuel to generate power. Each of these fuels may be supplied in a pressurized manner to fuel rail 14. For example, machine 10 may include a source of fuel (e.g. a fuel tank) in fluid communication with the fuel rail 14 via a shutoff valve and a regulator to provide pressurized fuel to fuel rail 14.

With reference to FIGS. 2 and 3, pressurized fuel is received by fuel rail inlet 82 at a longitudinal end of fuel rail 14 when the shutoff valve is open when machine 10 is in operation. The pressurized fuel is maintained within the fuel bore 34 defined by inner surface 28 of inlet end segment 18. With reference to FIGS. 3 and 4, fuel contained within fuel bore 34 of each segment 16 may surround at least a portion of an outer circumference of admission valve 38 within the fuel bore 34. Each admission valve 38 includes at least one opening and which selectively allows communication with outlet channel 60. When admission valve 38 opens, fuel is permitted to pass to outlet channel 60 at the second side 32 of tubular body 26. Pressurized fuel enters outlet channel 60 in response to a command from a controller (not shown) to open admission valve 38. The command to open admission valve 38 may be output from the controller at a predetermined timing with respect to engine demand and piston position.

Returning to FIG. 3, pressurized fuel may enter outlet channel 60 via inlet opening 62, which is accessible only when admission valve 38 is open. Thus, when admission valve 38 is opened in response to a command from a controller, fuel enters inlet opening 62, traverses first bend 66, and flows along transition passage 72 in a direction approximately parallel to fuel bore 34. The pressurized fuel transitions at second bend 68 to enter an angled passage 74 to travel from the second side 32 of to first side 30, eventually reaching outlet opening 64 at the end of straight passage 76 via third bend 70. Thus, outlet channel 60 provides an abbreviated and direct passage for fuel traveling from fuel bore 34 to outlet opening 64 when admission valve 38 is in an open position.

Once pressurized fuel reaches outlet opening 64 at the end of outlet channel 60, the fuel enters pressure line 80, as illustrated in FIG. 5. Pressure line 80 provides a direct passage from segment 16 to fuel admission input 100, allowing pressurized fuel to enter intake runner 98 promptly after admission valve 38 opens. Furthermore, as can be seen in FIG. 5, no admission valve is necessary between outlet opening 64 and fuel admission input 100.

Intake runner 98 provides a flow of charged air to a combustion chamber of internal combustion engine 12. Pressurized fuel flowing to fuel admission input 100 via pressure line 80 may be provided at a sufficient pressure to join and mix with the charged air passing from upstream portion 102 to downstream portion 104. A mixture of fuel and air may enter cylinder head 90 after passing from downstream portion 104. One or more intake valves may subsequently allow the air-fuel mixture to enter a combustion chamber of internal combustion engine 12 at a predetermined timing.

The fuel rail 14 disclosed herein may provide a fuel bore having an approximately constant cross sectional area. Thus, pressure drops during fuel movement into and out of the fuel rail 14 may be reduced, improving transient performance and maintaining a more consistent supply of fuel. Additionally, the location of the various components of fuel rail 14, and the location of the fuel rail itself, may provide an abbreviated passage to an admission valve, and an abbreviated passage from an outlet channel to an intake component of an internal combustion engine. Such aspects may provide improved performance in transient conditions and improved responsiveness.

It will be apparent to those skilled in the art that various modifications and variations can be made to the disclosed device without departing from the scope of the disclosure. Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A fuel rail for an engine, comprising:
   a tubular body having an outer surface and an inner surface, the inner surface defining a longitudinally extending fuel bore; and
   a valve bore extending normal to the fuel bore and extending through the outer surface of the tubular body at a first end and completely through the fuel bore to a second end;

the tubular body further including an outlet channel having an inlet opening and an outlet opening, the inlet opening being adjacent to and in fluid communication with the second end of the valve bore, and being at a different circumferential position on the tubular body than the outlet opening of the outlet channel.

2. The fuel rail of claim 1, wherein the fuel bore includes a bulge adjacent to the valve bore, the bulge extending outwardly from a longitudinal axis of the fuel bore and being configured to increase a cross-sectional area of the fuel bore adjacent the valve bore.

3. The fuel rail of claim 1, wherein the valve bore is offset with respect to a central axis of the fuel bore.

4. The fuel rail of claim 1, wherein the inlet opening is located at a different longitudinal position along the tubular body than the outlet opening.

5. The fuel rail of claim 1, wherein the inlet opening is located diametrically opposite along the tubular body than the outlet opening.

6. The fuel rail of claim 1, wherein the inlet opening is formed in the second end of the valve bore.

7. The fuel rail of claim 1, wherein the inlet opening is generally circumferentially aligned with the second end of the valve bore.

8. The fuel rail of claim 1, wherein the tubular body includes a modular flange at longitudinally-opposite ends thereof.

9. A fuel rail of claim 1, further including a plurality of identical fuel rail segments, each segment having the tubular body and valve bore.

10. A fuel rail segment for an internal combustion engine, comprising:
   a tubular body having an outer surface and an inner surface, the inner surface defining a longitudinally extending fuel bore;
   a valve bore extending normal to the fuel bore and through the outer surface of the tubular body at a first end and completely through the fuel bore to a second end; and an outlet channel having an inlet opening and an outlet opening, the inlet opening being adjacent to and in fluid communication with the second end of the valve bore, and being located at a different circumferential position on the tubular body than the outlet opening, the outlet channel including at least one bend section between the inlet opening and the outlet opening.

11. The fuel rail segment of claim 10, wherein the valve bore is located at a different longitudinal position along the tubular body than the outlet opening.

12. The fuel rail segment of claim 10, wherein the outlet channel includes a passage extending approximately parallel to the longitudinal fuel bore.

13. The fuel rail segment of claim 10, wherein the outlet channel includes a passage extending approximately orthogonal to the longitudinal fuel bore.

14. A fuel rail system for an internal combustion engine including an engine block and a cylinder head having a bottom surface facing the engine block, a top surface, and a side surface, the fuel rail system comprising:
   at least two fuel rail components connected by flanges on ends of the fuel rail components, one of the fuel rail components being an inlet end component having a fuel rail inlet;
   each of the fuel rail components being fixed to the side surface of the cylinder head and having:
      a tubular body with an outer surface and an inner surface;
      an outlet channel in fluid communication with the internal combustion engine, the outlet channel being open toward the top surface of the cylinder head; and
   a valve bore extending through the outer surface and being open towards the top surface of the cylinder head.

15. The fuel rail system of claim 14, wherein the outlet channel extends within the tubular body of the fuel rail.

16. The fuel rail system of claim 14, including an outlet end component provided on an opposite end of the fuel rail as the inlet end component, the outlet end component including a valve bore extending through an outer surface of the outlet end component and open toward the top surface of the engine head.

17. The fuel rail system of claim 1, wherein the outlet channel further includes at least one bend section between the inlet opening and the outlet opening.

18. The fuel rail system of claim 14, wherein each tubular body defines a fuel bore and each valve bore extends normal to its fuel bore and through the outer surface of its tubular body at a first end and completely through the fuel bore to a second end, and each outlet channel has an inlet opening and an outlet opening, the inlet opening being adjacent to and in fluid communication with the second end of its valve bore, and being located at a different circumferential position on its tubular body than its outlet opening.

19. The fuel rail system of claim 18, wherein each outlet channel includes at least one bend section between its inlet opening and its outlet opening.

20. The fuel rail segment of claim 19, wherein each inlet opening is located at a different longitudinal position along the tubular body than its outlet opening, and each outlet channel includes a passage extending approximately orthogonal to the longitudinal fuel bore.

* * * * *